United States Patent [19]

Sugie et al.

[11] Patent Number: 5,232,727

[45] Date of Patent: Aug. 3, 1993

[54] FROZEN FOOD AND PROCESS FOR PRODUCING THE SAME

[75] Inventors: Masayuki Sugie; Norio Iwaki, both of Tokyo, Japan

[73] Assignee: Asahi Denka Kogyo Kabushiki Kaisha, Tokyo, Japan

[21] Appl. No.: 833,531

[22] Filed: Feb. 10, 1992

[30] Foreign Application Priority Data

Feb. 22, 1991 [JP] Japan ................................. 3-50442

[51] Int. Cl.$^5$ ............................................. A21D 15/02
[52] U.S. Cl. ...................................... 426/549; 426/19; 426/524; 426/556
[58] Field of Search ................... 426/556, 549, 19, 524

[56] References Cited

U.S. PATENT DOCUMENTS

| 4,324,811 | 4/1982 | Eugley | 426/656 |
| 4,406,911 | 9/1983 | Larson et al. | 426/524 |
| 4,788,067 | 11/1988 | Seneau | 426/524 |
| 4,861,604 | 8/1989 | Tang et al. | 426/94 |
| 4,986,992 | 1/1991 | Glaras et al. | 426/524 |

FOREIGN PATENT DOCUMENTS

| 3-130034 | 6/1991 | Japan . |
| 2006416 | 4/1989 | Spain . |
| 2001517 | 2/1979 | United Kingdom . |

*Primary Examiner*—Jeanette Hunter
*Assistant Examiner*—Mary S. Mims
*Attorney, Agent, or Firm*—Young & Thompson

[57] ABSTRACT

The frozen food of the present invention is produced by adding a gelling agent comprising gelatin to a dough mainly consisting of wheat flour, fat and egg. The process for producing the frozen food of the present invention comprises adding a gelling agent comprising gelatin to dough materials mainly consisting of wheat flour, fat and egg to thereby give a dough and then molding and freezing said dough.

6 Claims, No Drawings

FROZEN FOOD AND PROCESS FOR PRODUCING
THE SAME

BACKGROUND OF THE INVENTION

1. Field of the Invention

This invention relates to frozen food which can be easily handled after thawing and a process for producing the same, particularly suitably applicable to sticky and soft foods such as cream puff doughs and French cruller doughs.

2. Description of the Prior Art

There have been marketed a number of frozen foods to be fried, for example, doughnuts and croquettes, and those to be baked, for example, bread, Danish pastries and pies.

Doughs containing a large amount of moisture, for example, cream puff doughs and French cruller doughs, are extremely soft per se and sticky, so that they are usually heated in an oven or a fryer immediately after the preparation. For example, a French cruller dough, which is highly sticky, is directly drawn onto a fryer in general. In order to thermally treat such doughs after freezing and thawing, therefore, it is necessary to employ various means differing from common procedures.

As a prior art relating to the freezing of sticky and soft food such as the above-mentioned cream puff doughs and French cruller doughs, Japanese Patent Laid-Open No. 130034/1991 disclosed a method for producing a frozen cream puff dough whereby cream puff cases of a uniform shape and a uniform volume can be easily produced by simply thawing and baking. However this method relates to a cream puff dough with a high freeze resistance and the frozen cream puff dough obtained thereby is thawed by putting it on an oven plate in a line and then baked in the oven as such. Therefore it is not necessary that the thawed cream puff dough have good handleability. Thus the abovementioned frozen cream puff dough shows unsatisfactory handleability after thawing.

Meanwhile, there have been known a number of frozen foods containing a gelling agent. In most of these cases, a gelling agent is added in order to give a jelly-like or pasty final product. Namely, there has not been reported any frozen food containing a gelling agent wherein the handleability of the product is improved by taking advantage of the gelling power of the gelling agent in a stage between thawing and cooking and then the effects of the gelling agent are eliminated in the final product following the cooking.

SUMMARY OF THE INVENTION

It is an object of the present invention to provide a frozen food which can be easily handled, retain its shape after thawing and has a good appearance and an excellent taste after cooking, and a process for producing the same.

The present inventors have conducted extensive studies in order to achieve the above object. As a result, they have found out that the stickiness of a sticky and soft dough (for example, a cream puff dough or a French cruller dough) after thawing can be largely suppressed by adding a specific gelling agent to the dough prior to the freezing.

Accordingly, the present invention, which has been completed based on the aforesaid finding, provides frozen food obtained by adding a gelling agent comprising gelatin to a dough mainly consisting of wheat flour, fat and egg.

The present invention further provides a process for producing the frozen food of the present invention which comprises adding a gelling agent comprising gelatin to dough materials mainly consisting of wheat flour, fat and egg to thereby give a dough and then molding and freezing the dough.

The frozen food of the present invention has the following advantages.

(1) It can be easily handles after thawing and retains its shape.
(2) After cooking, it has a good appearance and an excellent taste.
(3) It can be formulated into various foods.
Namely, cream puff cases and eclairs can be obtained by baking it after thawing, while French crullers and fried cream puffs can be obtained by frying it after thawing.
(4) It makes it possible to easily handle foods including cream puff cases, eclairs, French crullers and fried cream puffs in oven-fresh bakeries and fast-food restaurants.

DETAILED DESCRIPTION OF THE INVENTION

The dough to be used in the present invention mainly consists of wheat flour, fat and egg optionally together with saccharides, common salt and dairy products, if required. The dough usually comprises 100 parts (by weight; the same will apply hereinafter) of wheat flour, from 30 to 200 parts of fat, from 50 to 300 parts of egg (as a whole egg) and from 50 to 200 parts of water. The present invention is particularly applicable to sticky and soft doughs such as cream puff doughs and French cruller doughs.

A cream puff dough may preferably comprise from 30 to 200 parts of fat, from 50 to 200 parts of egg (as a whole egg) and from 50 to 200 parts of water, each per 100 parts of wheat flour. A French cruller dough may preferably comprise from 30 to 200 parts of fat, from 100 to 300 parts of egg (as a whole egg) and from 50 to 200 parts of water, each per 100 parts of wheat flour.

The wheat flour to be used in the present invention may be selected from among soft flour, medium flour and hard flour, among which hard flour is particularly suitable therefor.

Examples of the fat to be used in the present invention include vegetable oils such as cotton seed oil, corn oil, soybean oil, rapeseed oil, safflower oil, palm oil, coconut oil, palm kernel oil and cacao fat, animal fats such as beef tallow, lard, butter and milk fat, mixtures thereof, processed fats obtained by hardening, fractionating or transesterifying these fats, and emulsified fats obtained by processing them, for example, shortening and margarine.

The egg to be used in the present invention may be selected from among fresh eggs, liquefied eggs, frozen eggs, whole eggs, albumen, yolk and dry eggs.

Examples of the saccharides, which may be added if required, include sugar, fructose, glucose, sucrose and lactose. Examples of the dairy products, which may be added if required, include skim milk powder, whole fat milk powder, condensed and sweetened whole fat milk, and condensed and sweetened skim milk.

The dough may further contain inflating agents such as sodium bicarbonate and ammonium bicarbonate, emulsifiers such as glycerol/fatty acid monoesters, sorbitan/fatty acid esters, propylene glycol/fatty acid esters, and lecithin, various flavors, starches and proteins, if desired.

The gelling agent to be used in the present invention should exert its gelling power after thawing the frozen food and prior to cooking the same so as to maintain the dough in gelled state and then completely lose its gelling power after cooking so as not to affect the final product. As such a gelling agent, gelatin may be cited. As the gelatin to be used in the present invention, those marketed as edible gelatin may be selected. The gelling agent may be added in an amount of from 0.1 to 10% by weight, preferably from 1 to 2% by weight, based on the dough. When the content of the gelling agent is smaller than 0.1% by weight, the effect of the gelling agent is limited and thus a dough of good handleability can be hardly obtained. When the content thereof exceeds 10% by weight, on the contrary, undesirable results, for example, a poor voluminousness or a worsened flavor, are observed after cooking. In adding the gelling agent to the dough, it is advantageous that the gelling agent is preliminarily heated and dissolved in a small amount of water and/or egg.

Next, the process for producing the frozen food of the present invention will be described in detail.

First, a dough is prepared by adding a gelling agent to dough materials mainly consisting of wheat flour, fat and egg in, for example, the following manner.

Fat and water are boiled together and powders (wheat flour, saccharides, common salt, dairy products, etc.) are added thereto. Then the obtained mixture is kneaded at a low speed for 1 to 2 minutes to thereby gelatinize the starch in the wheat flour. When a pregelatinized starch powder is used, it is sometimes unnecessary to preliminarily boil the fat and water. Then the mixture is further kneaded at a high speed for 4 to 5 minutes while slowly adding the gelling agent, which has been dissolved in a small amount of water and/or egg, and egg to thereby give a dough.

Immediately after the completion of the kneading, it is sometimes observed that the dough has a significantly lowered viscosity. It is therefore recommended to set an appropriate floor time including the adjustment of temperature so as to control the viscosity of the dough and to impart plasticity thereto. It is enough to take a floor time of from 10 to 30 minutes.

Next, the dough thus obtained is molded into a desired shape. The temperature of the dough in the molding may preferably range from 30° to 40° C. The molding may be effected by using a mold of a suitable shape, a cream puff case depositor or a doughnut plunger.

Next, the molded product is frozen. It is preferable to quickly freeze the product at −25° C. or below from the viewpoint of preventing the development of ice crystals.

The frozen food of the present invention may be thawed by refrigerating at around 5° C., allowing to stand at room temperature ranging from 10° to 30° C., or placing in a final proofing room at 30° to 38° C. under a relative humidity of 70 to 85%.

After thawing, the frozen food of the present invention is cooked by, for example, baking or frying. In general, cream puffs are obtained by baking, while French crullers are obtained by frying.

To further illustrate the present invention in greater detail, the following Examples, Comparative Examples and Test Examples, whereby the effects of the frozen foods of the present invention are shown, will be given.

EXAMPLE 1

French cruller dough

A dough of the composition as specified in Table 1 was prepared by the following method. The fat and water were boiled and wheat flour was added thereto followed by kneading. Next, whole eggs were slowly added thereto under kneading. When the dough became smooth, ammonium bicarbonate was added and then the remainder of the whole eggs were further added. Simultaneously, the gelling agent (gelatin), which had been dissolved in a small amount of water and whole eggs, was added and the mixture was well stirred to thereby give a dough.

Next, the dough thus obtained was molded into pellets or a ring and then quickly frozen at −25° C. for 1 hour to thereby give the frozen food (invention product 1) of the present invention.

COMPARATIVE EXAMPLE 1

The procedure of the above Example 1 was repeated except that no gelling agent was added. Thus another frozen food (comparative product 1) was obtained.

EXAMPLE 2 cream puff dough

A dough of the composition as specified in the Table 1 was prepared by the following method. The fat and water were boiled and wheat flour, saccharides and common salt were added thereto followed by kneading. Next, whole eggs were slowly added thereto and the gelling agent (gelatin), which had been dissolved in a small amount of water and whole eggs, was added and the mixture was well stirred to thereby give a dough.

Next, the dough thus obtained was molded into pellets or a ring and then quickly frozen at −25° C. for 1 hour to thereby give the frozen food (invention product 2) of the present invention.

COMPARATIVE EXAMPLE 2

The procedure of the above Example 2 was repeated except that no gelling agent was added. Thus another frozen food (comparative product 2) was obtained.

TABLE 1

| Composition | Example | | Comparative Example (unit: part by weight) | |
|---|---|---|---|---|
| | 1 | 2 | 1 | 2 |
| hard wheat flour | 100 | 100 | 100 | 100 |
| refined sugar | — | 3.3 | — | 3.3 |
| common salt | — | 1.7 | — | 1.7 |
| margarine | 130 | 58 | 130 | 58 |
| water | 140 | 167 | 140 | 167 |
| whole egg | 230 | 117 | 230 | 117 |
| ammonium bicarbonate | 1 | — | 1 | — |
| gelling agent | 6.0 | 4.5 | — | — |

TEST EXAMPLE 1

The invention products 1 and 2 respectively obtained in the Examples 1 and 2 and the comparative products 1 and 2 respectively obtained in the Comparative Examples 1 and 2 were stored for 1 month in a frozen state and then thawed at 20° C. for 1 hour. Then the workabilities (handleability and shape retention) of each thawed product were evaluated. After thawing, the invention product 1 and the comparative product 1 were fried at 180° to 190° C. for 5 to 10 minutes, while the invention product 2 and the comparative product 2 were baked in an oven at 200° to 210° C. for 25 to 30 minutes. Then the conditions (appearance and taste) of each cooked product were evaluated. Table 2 summarizes the results.

As the table shows, the invention products 1 and 2 were easily handleable after thawing and had each a good appearance and an excellent taste after cooking. In contrast, the comparative products 1 and 2 were so sticky that they were difficult to handle and lost the original shape. After cooking, the comparative products 1 and 2 had each an excellent taste but a poor appearance because they lost the original shape.

TABLE 2

|  |  | Invention product | | Comparative product | |
| --- | --- | --- | --- | --- | --- |
|  |  | 1 | 2 | 1 | 2 |
| Workability after thawing | shape retention | good | good | bad | bad |
|  | handleability | easy | easy | difficult | difficult |
| Conditions after cooking | appearance | good | good | poor | poor |
|  | taste | good | good | good | good |

Evaluation criteria:
Shape retention
good: retaining the asmolded shape,
bad: not retaining the asmolded shape.
Handleability
easy: not sticking to fingers,
difficult: sticky and spreadable.
Appearance
good: uniformly voluminous,
poor: nonuniform.
Taste
good: almost the same as that of a product prepared by baking or frying an unfrozen dough,
poor: different from that of a product prepared by baking or frying an unfrozen dough.

What is claimed is:

1. A frozen food produced by adding a gelling agent comprising gelatin to a dough mainly consisting of wheat flour, fat and oil and egg, wherein said dough is a cream puff dough comprising 100 parts by weight of wheat flour, from 30 to 200 parts by weight of fat and oil, from 50 to 200 parts by weight of egg and from 50 to 200 parts by weight of water; or a French cruller dough comprising 100 parts by weight of wheat flour, from 30 to 200 parts by weight of fat and oil, from 100 to 300 parts by weight of egg and from 50 to 200 parts by weight of water; and freezing said dough.

2. The frozen food as claimed in claim 1, wherein said gelling agent is added in an amount of from 0.1 to 10% by weight based on the dough.

3. A process for producing a frozen food, which comprises adding a gelling agent comprising gelatin to dough materials mainly consisting of wheat flour, fat and oil and egg to thereby give a dough and then molding and freezing said dough, wherein said dough is a cream puff dough comprising 100 parts by weight of wheat flour, from 30 to 200 parts by weight of fat and oil, from 50 to 200 parts by weight of egg and from 50 to 200 parts by weight of water; or a French cruller dough comprising 100 parts by weight of wheat flour, from 30 to 200 parts by weight of fat and oil, from 100 to 300 parts by weight of egg and from 50 to 200 parts by weight of water.

4. The process according to claim 3, wherein said gelling agent is added in an amount of from 0.1 to 10% by weight based on the dough.

5. The process according to claim 4, wherein said gelling agent is added in an amount of from 1 to 2% by weight based on the dough.

6. The frozen food as claimed in claim 2, wherein said gelling agent is added in an amount of from 1 to 2% by weight based on the dough.

* * * * *